(12) United States Patent
Zhang et al.

(10) Patent No.: US 11,830,277 B2
(45) Date of Patent: Nov. 28, 2023

(54) DISPLAY PANEL WITH INTEGRATED FINGERPRINT SENSOR

(71) Applicant: WUHAN CHINA STAR OPTOELECTRONICS TECHNOLOGY CO., LTD., Hubei (CN)

(72) Inventors: Zhou Zhang, Hubei (CN); Changwen Ma, Hubei (CN); Pan Xu, Hubei (CN)

(73) Assignee: WUHAN CHINA STAR OPTOELECTRONICS TECHNOLOGY CO., LTD., Hubei (CN)

( * ) Notice: Subject to any disclaimer, the term of this patent is extended or adjusted under 35 U.S.C. 154(b) by 637 days.

(21) Appl. No.: 16/956,966

(22) PCT Filed: Mar. 27, 2020

(86) PCT No.: PCT/CN2020/081629
§ 371 (c)(1),
(2) Date: Jun. 22, 2020

(87) PCT Pub. No.: WO2021/168967
PCT Pub. Date: Sep. 2, 2021

(65) Prior Publication Data
US 2022/0122371 A1    Apr. 21, 2022

(30) Foreign Application Priority Data
Feb. 27, 2020    (CN) .......................... 202010123788.0

(51) Int. Cl.
*G06V 40/13*    (2022.01)
*G02F 1/1335*    (2006.01)
(Continued)

(52) U.S. Cl.
CPC ...... *G06V 40/1318* (2022.01); *G02F 1/13338* (2013.01); *G02F 1/133514* (2013.01); *G02F 1/133531* (2021.01); *G02F 1/134345* (2021.01)

(58) Field of Classification Search
None
See application file for complete search history.

(56) References Cited

U.S. PATENT DOCUMENTS

| 2012/0105400 | A1* | 5/2012 | Mathew | ............... | G06F 1/1626 |
| | | | | | 345/207 |
| 2012/0200812 | A1* | 8/2012 | Qi | ....................... | B23K 26/38 |
| | | | | | 156/267 |

(Continued)

FOREIGN PATENT DOCUMENTS

| CN | 105868742 A | 8/2016 |
| CN | 107621712 A | 1/2018 |

(Continued)

OTHER PUBLICATIONS

Chinese Office Action issued in corresponding Chinese Patent Application No. 202010123788.0 dated Feb. 10, 2023, pp. 1-7.

*Primary Examiner* — Ryan Crockett
(74) *Attorney, Agent, or Firm* — PV IP PC; Wei Te Chung; Zhigang Ma (57) ABSTRACT

A display panel is provided, comprising a backlight module, a first substrate, a liquid crystal layer, a second substrate, and a glass cover, wherein the second substrate comprises a fingerprint identification layer configured for identifying information from a fingerprint of a user. The second substrate provided with the fingerprint identification layer is disposed close to the glass cover, making the fingerprint identification layer closer to the fingerprint of the user, shortening a path of the light reflected by the fingerprint to (Continued)

the fingerprint identification sensors, and improving fingerprint identification effectiveness.

16 Claims, 6 Drawing Sheets

(51) Int. Cl.
*G02F 1/1343* (2006.01)
*G02F 1/1333* (2006.01)

(56) References Cited

U.S. PATENT DOCUMENTS

| | | | |
|---|---|---|---|
| 2017/0372113 A1* | 12/2017 | Zhang | H10K 50/854 |
| 2018/0121703 A1* | 5/2018 | Jung | G06V 40/1324 |
| 2018/0247100 A1* | 8/2018 | Zhu | G06V 40/1318 |
| 2020/0193126 A1* | 6/2020 | Shi | G02F 1/1368 |
| 2020/0409191 A1* | 12/2020 | He | G02F 1/1335 |
| 2021/0133418 A1* | 5/2021 | Liu | G06V 10/147 |

FOREIGN PATENT DOCUMENTS

| | | |
|---|---|---|
| CN | 107994034 A | 5/2018 |
| CN | 109031782 A | 12/2018 |
| CN | 109521590 A | 3/2019 |
| CN | 109598248 A | 4/2019 |
| CN | 110045534 A | 7/2019 |
| CN | 110426875 A | 11/2019 |
| CN | 110501839 A | 11/2019 |
| CN | 110543043 A | 12/2019 |
| KR | 20150029129 A | 3/2015 |

* cited by examiner

DISPLAY PANEL WITH INTEGRATED FINGERPRINT SENSOR

TECHNICAL FIELD

The present disclosure relates to the field of display technology, and in particular, to a display panel.

BACKGROUND

In current display devices such as smart phones, fingerprint identification sensors are usually placed at a position where a menu button (home button) is placed. But with the advent of an age of full-body screen displays, screen borders are becoming narrower and narrower, with the menu button also being gradually phased out. Therefore, a temporary solution has been to place the fingerprint identification sensors on a side or a backside of the phone, with a general trend in fingerprint identification technology development aiming to place the fingerprint identification sensors within or under the screen.

At present, a solution of under-screen fingerprint identification based on liquid crystal display technology is using fingerprint identification sensors placed on a thin film transistor array substrate to capture light reflected by a fingerprint of a user emitted by a backlight module to generate the fingerprint information the user. The existing liquid crystal display panel structure determines that the light reflected by the fingerprint need to pass through multilayer panel structures, such as a color filter substrate layer and a liquid crystal layer, before reaching the fingerprint identification sensors. These panel structures will in varying degrees weaken the light reflected by the fingerprint, resulting in the fingerprint identification sensors detecting incomplete or functionally-useless fingerprint information, which seriously affects user experience.

In the existing technology, a fingerprint identification function of the liquid crystal display panel is affected by the multilayer structures of the liquid crystal display panel, weakening the light reflected by the fingerprint, leading to a weakening or failure of the fingerprint identification function.

SUMMARY

In order to solve above technical problems, the solutions of the present disclosure are described as follows.

An embodiment of the present disclosure provides a display panel. The display panel comprises a backlight module configured as a light emitting unit of the display panel, a first substrate disposed on the backlight module and comprising a color filter layer, a second substrate disposed opposite to the first substrate away from the backlight module, wherein the second substrate comprises at least a thin film transistor array layer and a fingerprint identification layer, and the fingerprint identification layer is configured for identifying user's fingerprint information, a liquid crystal layer comprising liquid crystals and disposed between the first substrate and the second substrate, and a glass cover disposed on the second substrate away from the liquid crystal layer.

In a display panel provided in an embodiment of the present disclosure, the fingerprint identification layer comprises fingerprint identification sensors.

In a display panel provided in an embodiment of the present disclosure, an upper polarizer is disposed between the second substrate and the glass cover and a lower polarizer is disposed between the first substrate and the backlight module, wherein the upper polarizer comprises light transmitting units vertically corresponding to the fingerprint identification sensors.

In a display panel provided in an embodiment of the present disclosure, the light transmitting units comprise collimators or transmitting holes distributed in the upper polarizer.

In a display panel provided in an embodiment of the present disclosure, the fingerprint identification layer is disposed close to the liquid crystal layer.

In a display panel provided in an embodiment of the present disclosure, the fingerprint identification layer is disposed away from the liquid crystal layer.

In a display panel provided in an embodiment of the present disclosure, the second substrate comprises a touch functional layer configured for realizing touch function of the display panel.

In a display panel provided in an embodiment of the present disclosure, the color filter layer comprises color filter units, and the second substrate comprises pixel electrodes which are in one-to-one correspondence with the color filter units to drive the liquid crystals to deflect, wherein each of the pixel electrodes corresponds to one of pixel units of the display panel, and the fingerprint identification sensors and the pixel units are mismatched in arrangement.

In a display panel provided in an embodiment of the present disclosure, a plane parallel to the second substrate is defined as a projective plane, and a projection of the fingerprint identification sensors on the projective plane does not overlap a projection of the pixel electrodes on the projective plane.

In a display panel provided in an embodiment of the present disclosure, the color filter units comprise red filter units, green filter units, and blue filter units.

In a display panel provided in an embodiment of the present disclosure, the pixel electrodes of the second substrate comprise red pixel electrodes, green pixel electrodes, and blue pixel electrodes, and the red pixel electrodes, the green pixel electrodes, and the blue pixel electrodes correspond to the red filter units, the green filter units, and the blue filter units respectively.

In a display panel provided in an embodiment of the present disclosure, the pixel units are disposed in rows side by side on the display panel, and each of the fingerprint identification sensors is disposed between two adjacent rows of the pixel units.

In a display panel provided in an embodiment of the present disclosure, the pixel units are disposed in rows side by side on the display panel, and each of the fingerprint identification sensors is disposed between two adjacent pixel units in a single row of the pixel units.

In a display panel provided in an embodiment of the present disclosure, a group consists of three adjacent pixel units in each of the rows of the pixel units, and the group is provided with one of the fingerprint identification sensors.

In a display panel provided in an embodiment of the present disclosure, the pixel units are disposed in rows side by side on the display panel, an area of one part of the pixel units is less and is defined as first pixel units, and the other part of the pixel units is defined as second pixel units, wherein the fingerprint identification sensors and the first pixel units are disposed side by side along a column direction.

In a display panel provided in an embodiment of the present disclosure, the fingerprint identification layer covers a portion of the display panel.

In a display panel provided in an embodiment of the present disclosure, the fingerprint identification layer covers a whole display area of the display panel.

An embodiment of the present disclosure provides a display panel. The display panel comprises a backlight module configured as a light emitting unit of the display panel, a first substrate disposed on the backlight module and comprising a color filter layer, a second substrate disposed opposite to the first substrate away from the backlight module, wherein the second substrate comprises at least a thin film transistor array layer and a fingerprint identification layer, and the fingerprint identification layer is configured for identifying user's fingerprint information, a liquid crystal layer comprising liquid crystals and disposed between the first substrate and the second substrate, and a glass cover disposed on the second substrate away from the liquid crystal layer, wherein the fingerprint identification layer comprises fingerprint identification sensors, and an upper polarizer is disposed between the second substrate and the glass cover and comprises collimators or transmitting holes vertically corresponding to the fingerprint identification sensors.

In the display panels provided in the embodiments of the present disclosure, the second substrate provided with the fingerprint identification layer is disposed close to the glass cover of the display panel, making the fingerprint identification layer closer to user's fingerprint, shortening path of the light reflected by fingerprint to the fingerprint identification sensors, and eliminating influence of the liquid crystal layer on the light reflected by fingerprint. The upper polarizer is provided with the light transmitting units corresponding to the fingerprint identification sensors to reduce weakening of the fingerprint reflected light, thereby improving fingerprint identification effect.

BRIEF DESCRIPTION OF DRAWINGS

To describe the technical solutions of the embodiments of the present disclosure more clearly, the following briefly introduces the accompanying drawings used in the description of the embodiments of the present disclosure. Apparently, the accompanying drawings described below illustrate only some exemplary embodiments of the present disclosure, and persons skilled in the art may derive other drawings from the drawings without making creative efforts.

DETAILED DESCRIPTION OF PREFERRED EMBODIMENTS

The following description of every embodiment with reference to the accompanying drawings is used to exemplify a specific embodiment which may be carried out in the present disclosure. Directional terms mentioned in the present disclosure, such as "top", "bottom", "front", "back", "left", "right", "inside", "outside", "side" etc., are only used with reference to the orientation of the accompanying drawings. Therefore, the used directional terms are intended to illustrate, but not to limit, the present disclosure. In the drawings, the units with similar structures are represented by the same reference numbers.

In the display panels provided in the embodiments of the present disclosure, a second substrate provided with a fingerprint identification layer is disposed close to a glass cover of the display panels, making the fingerprint identification layer closer to a fingerprint of a user, shortening a path of light reflected by the fingerprint to a fingerprint identification sensor, and eliminating influence of a liquid crystal layer on the light reflected by the fingerprint. An upper polarizer is provided with light transmitting units corresponding to the fingerprint identification sensors to reduce weakening of the fingerprint-reflected light, thereby improving fingerprint identification effectiveness.

Figure 1:
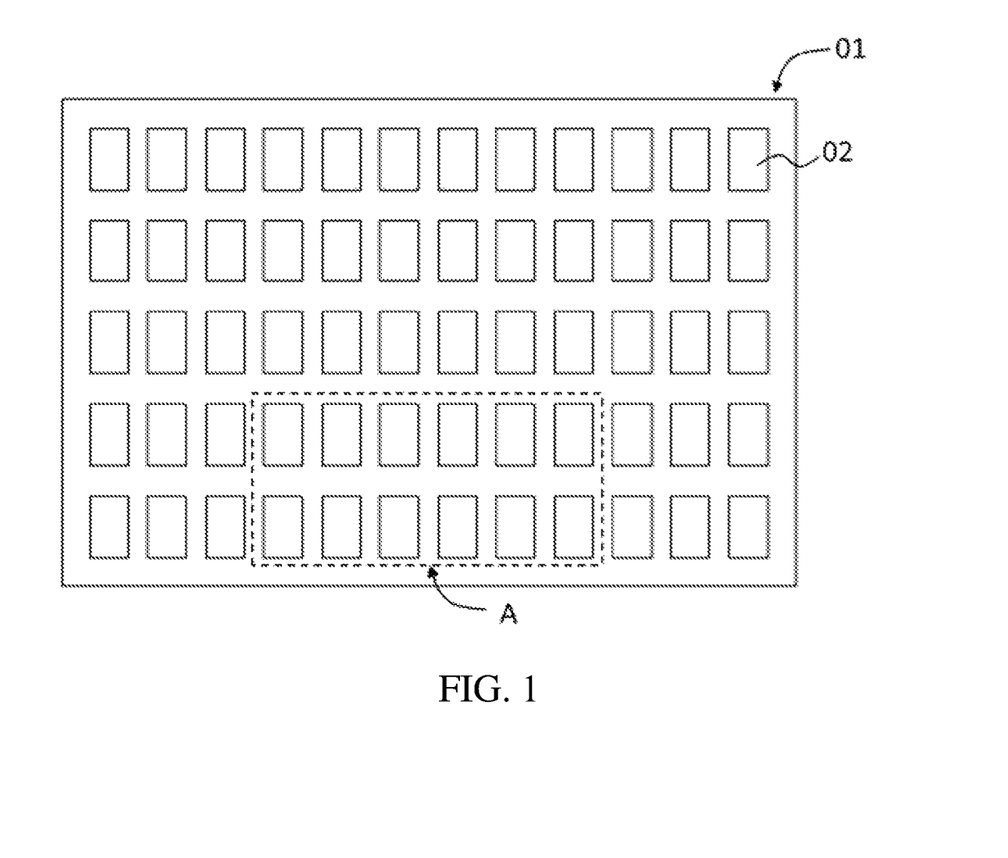
FIG. 1 is a planar schematic diagram illustrating a display panel according to an embodiment of the present disclosure.
Figure 2:
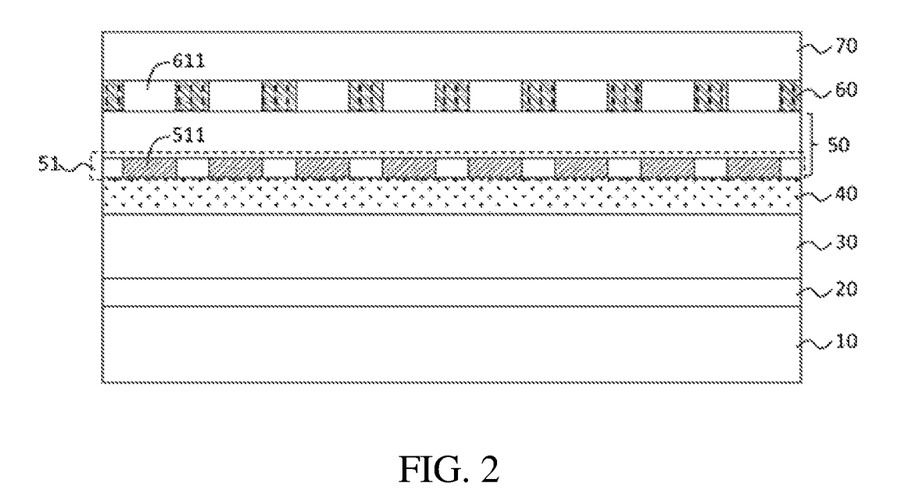
FIG. 2 is a schematic diagram illustrating a layered structure of a display panel according to an embodiment of the present disclosure.

FIG. 1 is a planar schematic diagram illustrating a display panel according to an embodiment of the present disclosure, and FIG. 2 is a schematic diagram illustrating a layered structure of a display panel according to an embodiment of the present disclosure. As shown in FIG. 1 and FIG. 2, a display panel 01 comprises pixel units 02 arranged in an array. It should be noted that, the display panel 01 shown in FIG. 1 can be either a partial or a complete structural diagram of the display panel provided in the embodiment of the present disclosure, and a number of the pixel units 02 comprised within the display panel 01 is not limited. The pixel unit 02 is a basic unit of the display panel 01 for displaying picture, and is a general area of the display panel 01, wherein the general area comprises an array substrate, a color filter substrate, and a corresponding structure of a liquid crystal layer of the display panel 01.

A layered structure of the display panel 01 comprises a backlight module 10, a first substrate 30, a liquid crystal layer 40, a second substrate 50, and a glass cover plate 70.

The backlight module 10 is a light-emitting unit of the display panel 10, and is configured to provide a light source for the display panel 10 when displaying pictures. A light output direction of the backlight module 10 faces toward the first substrate 30. After passing through the first substrate 30, the liquid crystal layer 40, and the second substrate 50 in sequence, the light emerges through the glass cover plate 70 to display different pictures.

Optionally, a lower polarizer 20 is disposed on the backlight module 10 to adjust a polarization direction of the light emitted by the backlight module 10.

Figure 7:
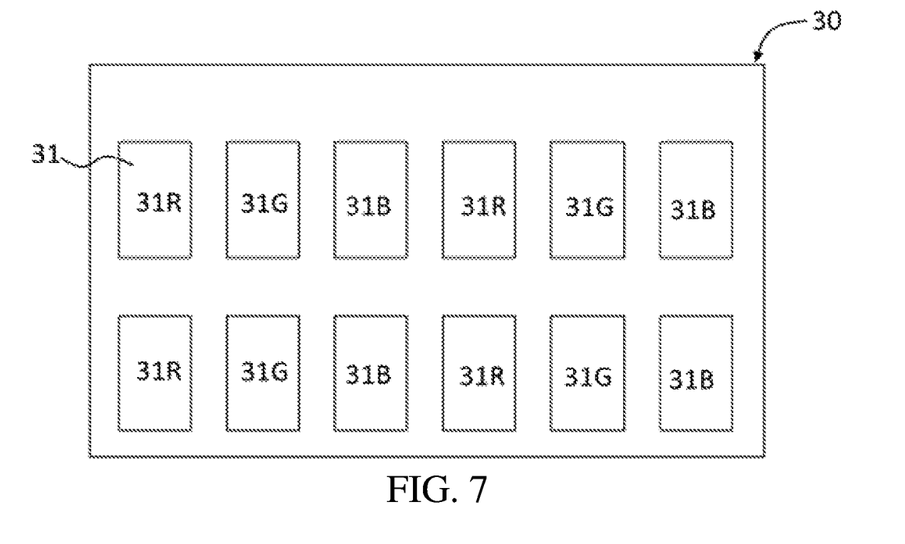
FIG. 7 is a schematic structural diagram illustrating an implementation mode of a first substrate in the area A of the display panel shown in FIG. 1 corresponding to the implementation mode of the second substrate shown in FIG. 4.

FIG. 7 is a schematic diagram illustrating an implementation mode of a first substrate in an area A of the display panel shown in FIG. 1. As shown in FIG. 1, FIG. 2, and FIG. 7, the first substrate 30 is disposed on the lower polarizer 20, and the first substrate 30 comprises a color filter layer 31, wherein the color filter layer 31 comprises color filter units, such as red filter units 31R, green filter units 31G, and blue filter units 31B shown in FIG. 7, with each of the color filter units corresponding to one of the pixel units 02. It should be understood that the light emitted by the backlight module 10 is white light, which forms red, green and blue monochromatic light after passing through the color filter layer 31. Different combinations of these three monochromatic lights will produce different color pictures, so as to achieve color display of the display panel 01.

The liquid crystal layer 40 is disposed between the first substrate 30 and the second substrate 50 and comprises liquid crystals. The liquid crystals within the liquid crystal layer 40 have different deflection angles to regulate passing states of light, and is an important structure of the display panel 01 to display different pictures. Optionally, an alignment film is arranged between the liquid crystal layer 40 and the first substrate 30, and the alignment film is used to position the liquid crystals at an initial deflection angle.

The second substrate 50 is disposed opposite to the first substrate 30 away from the backlight module. A gap is left between the first substrate 30 and the second substrate 50 to contain the liquid crystal layer 40. The second substrate 50 comprises at least a thin film transistor array layer (not shown) and a fingerprint identification layer 51. The thin film transistor array layer comprises thin film transistors, gate lines, data lines, pixel electrodes, and other functional elements to provide data signals and scan signals for the display panel 01 and to control display functions of the display panel 01.

The fingerprint identification layer 51 is configured for identifying information from the fingerprint of the user. Optionally, the fingerprint identification layer 51 comprises fingerprint identification sensors 511, and the fingerprint identification sensors 511 are electrically connected to an external fingerprint identification chip, wherein the fingerprint identification sensors 511 can detect light reflected by the fingerprint of the user, and feed information of the light reflected by the fingerprint back to the fingerprint identification chip. The fingerprint identification chip can identify the fingerprint of the user according to information from the light reflected by the fingerprint.

Optionally, the fingerprint identification layer 51 is disposed at a side of the second substrate 50 close to the liquid crystal layer 40, or the fingerprint identification layer 51 is disposed at a side of the second substrate 50 away from the liquid crystal layer 40. It should be understood that the fingerprint identification layer 51 comprised in the second substrate 50 can utilize a wiring arrangement space of the second substrate 50 to optimize a wiring structure of the fingerprint identification layer 51, for example, the fingerprint identification sensors 511 can be connected to wirings of the external fingerprint identification chip, or wirings connected to the fingerprint identification sensors 511 can be disposed on a data line layer or a gate line layer of the second substrate 50, thus saving the wiring arrangement space of the display panel 01.

Optionally, the second substrate 50 comprises a touch functional layer (not shown), and the touch functional layer is configured for realizing touch function of the display panel 01.

Optionally, an upper polarizer 60 is disposed between the second substrate 50 and the glass cover 70 for adjusting polarization direction of light and optimizing display effect of the display panel 01. The upper polarizer 60 comprises light transmitting units 611 that vertically correspond to the fingerprint identification sensors 511. The light transmitting units 611 is used to prevent the light reflected by the fingerprint from being weakened and blocked when passing through the upper polarizer 60, thus enabling the fingerprint identification sensors 511 to capture the actual light reflected by the fingerprint.

Figure 3:
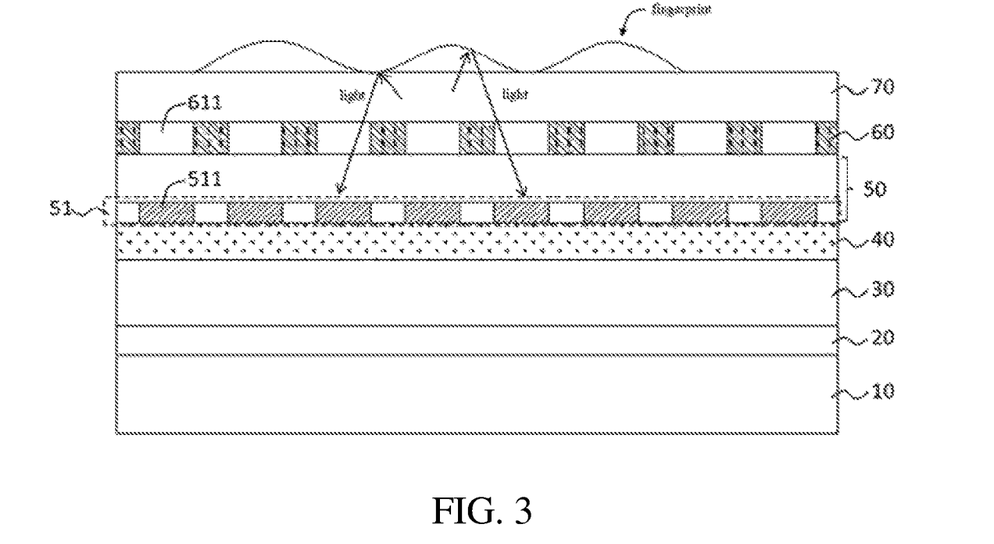
FIG. 3 is a schematic diagram illustrating a fingerprint identification layer of the display panel shown in FIG. 2 reflecting light reflected by fingerprint.

Optionally, the light transmitting units 611 can comprise collimators or light transmitting holes distributed in the upper polarizer 60. As shown in FIG. 3, the light reflected by fingerprint can reach the fingerprint identification sensors 511 after passing through the light transmission units 611. It should be understood that both the light transmission holes and the collimators can ensure that the light reflected by the fingerprint passes through the upper polarizer 60 without changing the polarization direction, wherein the collimators can adjust a propagation direction of the light reflected by the fingerprint, so that the light reflected by fingerprint is aimed directly perpendicular towards the fingerprint identification sensors 511, thus ensuring accuracy of fingerprint identification.

The glass cover 70 is used to encapsulate an out-light surface of the display panel 01 to prevent external objects from corroding internal components of the display panel 01. Optionally, a thin film encapsulation layer (not shown) can be arranged between the glass cover 70 and the upper polarizer 60, and the thin film encapsulation layer is used to seal the internal components of the display panel 01 to prevent corrosion due to exposure to external air and moisture.

With regard to distribution characteristics of the fingerprint identification sensors 511 on the second substrate 50, the embodiment of the present disclosure provides the following alternative implementation modes, but is not limited to these implementation modes.

Figure 4:
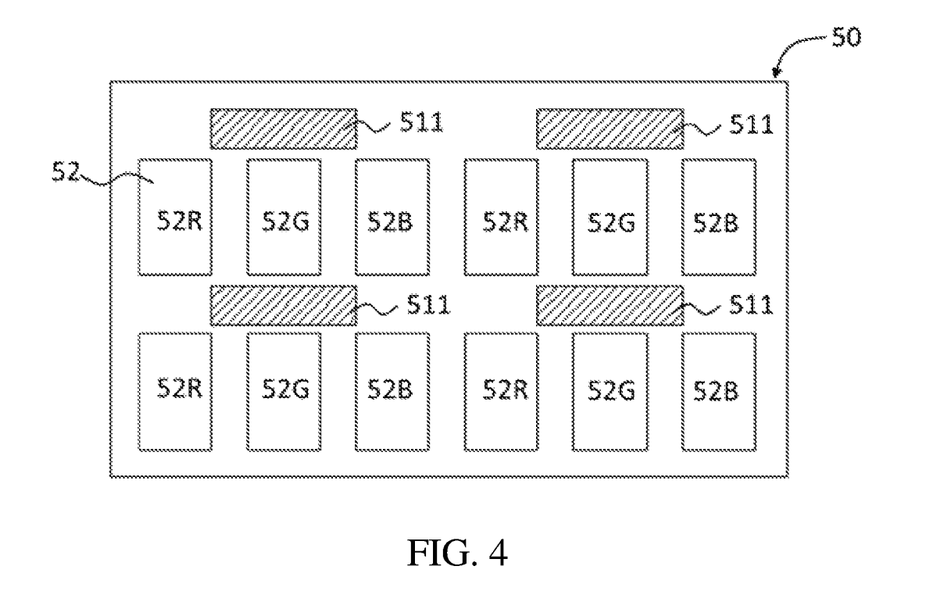
FIG. 4 is a schematic structural diagram illustrating an implementation mode of a second substrate in area A of the display panel shown in FIG. 1.

According to one implementation mode, as shown in FIG. 1, FIG. 4, and FIG. 7, the second substrate 50 comprises pixel electrodes 52 arranged in array, and the first substrate 30 comprises color filter units 31 in one-to-one correspondence with the pixel electrodes 52, wherein each of the pixel electrodes 52 corresponds to one of the pixel units 02. The fingerprint identification sensors 511 and the pixel electrodes 52 are mismatched in arrangement, that is, in a plane parallel to the second substrate 50 assumed as a projection plane, a projection of the fingerprint identification sensors 511 on the projection plane does not overlap with a projection of the pixel electrodes 52 on the projection plane.

Further, the pixel electrodes 52 are disposed in rows side-by-side on the second substrate 50, and each row comprises the pixel electrodes 52 and a gap is left between each two adjacent rows of the pixel electrodes 52. The fingerprint identification sensors are arranged in the gaps between adjacent rows of the pixel electrodes 52. It should be understood that since each pixel electrode 52 corresponds to one single pixel unit 02, the fingerprint identification sensors 511 are arranged between adjacent rows of the pixel units 02.

Optionally, the pixel units 02 are divided into red pixel units, green pixel units, and blue pixel units, which correspond to the red filter units 31R, the green filter units 31G, and the blue filter units 31B of the first substrate 30 respectively, and correspond to red pixel electrodes 52R, green pixel electrodes 52G, and blue pixel electrodes 52B of the second substrate 50 respectively. The red pixel electrodes 52R, the green pixel electrodes 52G, and the blue pixel electrodes 52B in each row are arranged periodically in order, and a group consists of three adjacent pixel electrodes 52 (each group comprising one red pixel electrode 52R, one green pixel electrode 52G, and one blue pixel electrode 52B) and is provided with one fingerprint identification sensor 511.

Figure 5:
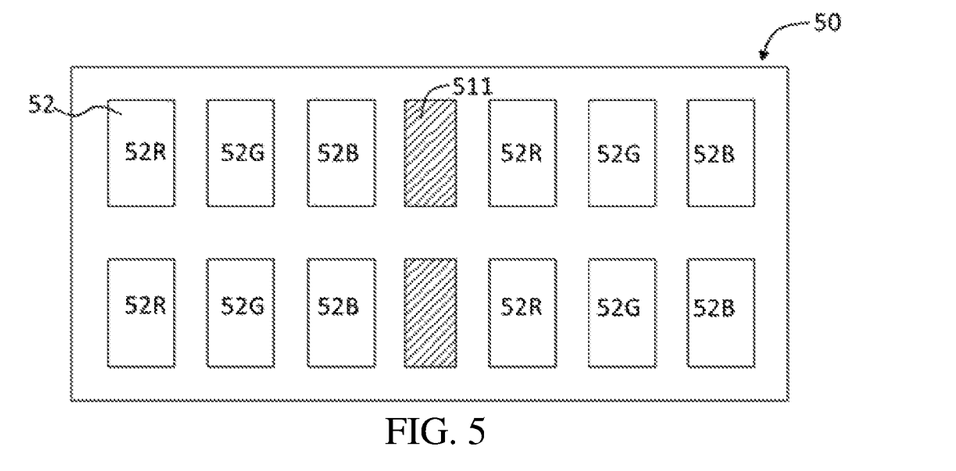
FIG. 5 is a schematic structural diagram illustrating another implementation mode of the second substrate in the area A of the display panel shown in FIG. 1.
Figure 8:
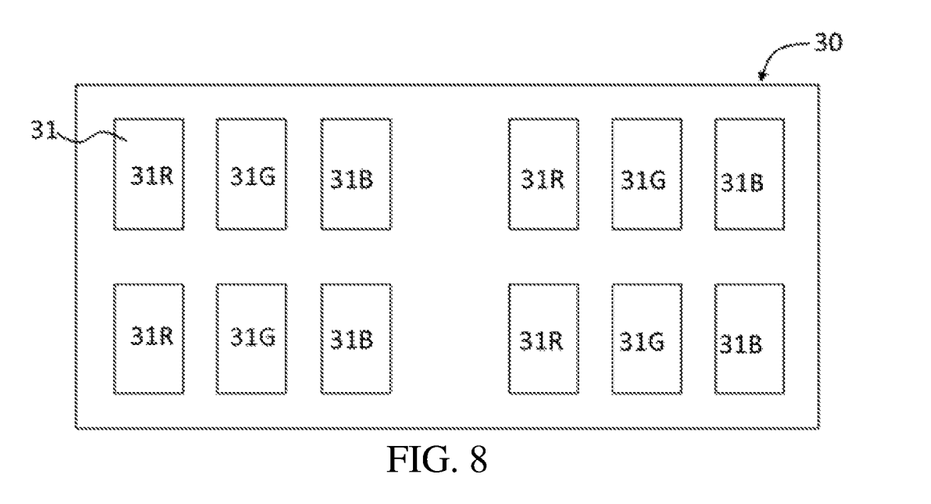
FIG. 8 is a schematic structural diagram illustrating an implementation mode of the first substrate in the area A of the display panel shown in FIG. 1 corresponding to the implementation mode of the second substrate shown in FIG. 5.

According to another implementation mode, as shown in FIG. 1, FIG. 5, and FIG. 8, the second substrate 50 comprises pixel electrodes 52 arranged in array, and the first substrate 30 comprises color filter units 31 that correspond one-to-one with the pixel electrodes 52, wherein each of the pixel electrodes 52 corresponds to one of the pixel units 02. The fingerprint identification sensors 511 and the pixel electrodes 52 are mismatched in arrangement, that is, in a plane parallel to the second substrate 50 assumed as a projection plane, a projection of the fingerprint identification sensors 511 on the projection plane does not overlap with a projection of the pixel electrodes 52 on the projection plane.

Further, the pixel electrodes 52 are disposed in rows side by side on the second substrate 50. Each row comprises the pixel electrodes 52, and each of the fingerprint identification sensors 511 is arranged side by side with the pixel electrodes 52 and is arranged between two adjacent of the pixel electrodes 52 in a single row. It should be understood that since each pixel electrode 52 corresponds to one single pixel unit 02, each of the fingerprint identification sensors 511 is arranged between two adjacent pixel units 02 within a single row.

Optionally, the pixel units 02 are divided into red pixel units, green pixel units, and blue pixel units, which correspond to the red filter units 31R, the green filter units 31G, and the blue filter units 31B of the first substrate 30 respectively, and correspond to red pixel electrodes 52R, green pixel electrodes 52G, and blue pixel electrodes 52B of the second substrate 50 respectively. The red pixel electrodes 52R, the green pixel electrodes 52G, and the blue pixel electrodes 52B in each row are arranged periodically in order, and each group consists of three adjacent pixel electrodes 52 (comprising one red pixel electrode 52R, one green pixel electrode 52G, and one blue pixel electrode 52B) and each of the fingerprint identification sensors 511 is disposed between two adjacent groups.

Figure 6:
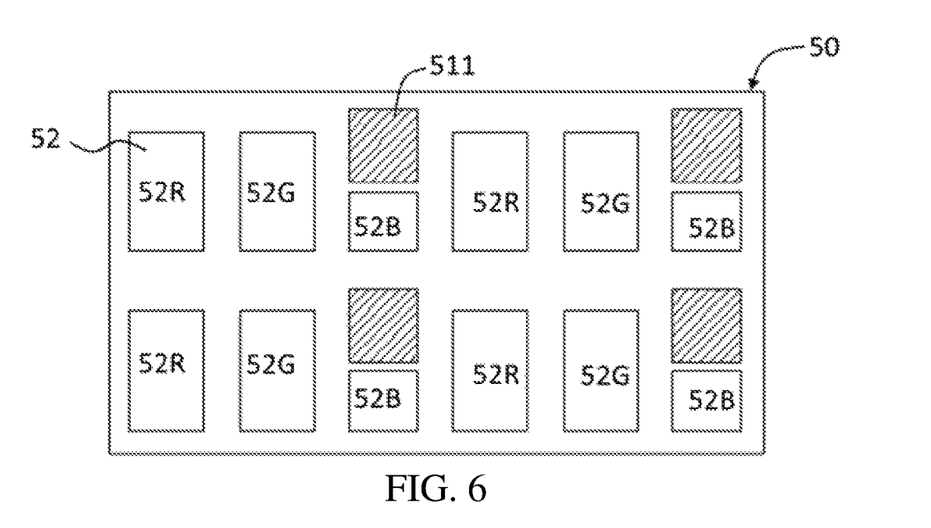
FIG. 6 is a schematic structural diagram illustrating still another implementation mode of the second substrate in the area A of the display panel shown in FIG. 1.
Figure 9:
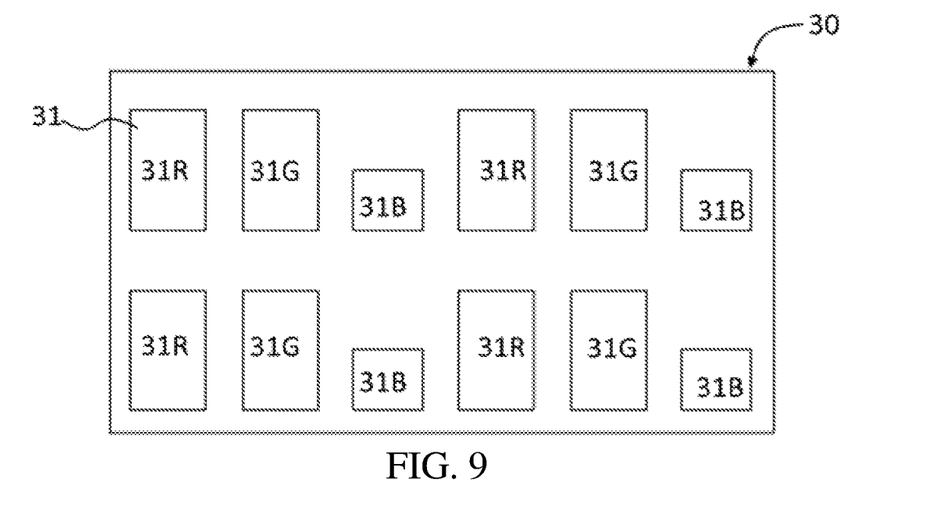
FIG. 9 is a schematic structural diagram illustrating an implementation mode of the first substrate in the area A of the display panel shown in FIG. 1 corresponding to the implementation mode of the second substrate shown in FIG. 6.

According to still another implementation mode, as shown in FIG. 1, FIG. 6, and FIG. 9, the second substrate 50 comprises pixel electrodes 52 arranged in array, and the first substrate 30 comprises color filter units 31 in one-to-one correspondence with the pixel electrodes 52, wherein each of the pixel electrodes 52 corresponds to one of the pixel units 02. The fingerprint identification sensors 511 and the pixel electrodes 52 are mismatched in arrangement, that is, a plane parallel to the second substrate 50 is assumed as a projective plane, and a projection of the fingerprint identification sensors 511 on the projective plane does not overlap a projection of the pixel electrodes 52 on the projective plane.

Furthermore, the pixel electrodes 52 are disposed in rows side by side on the second substrate 50. Each row comprises the pixel electrodes 52, and an area of one part of the pixel electrodes 52 is less and is defined as a first pixel electrode, and the other parts of the pixel electrodes 52 are defined as second pixel electrodes, wherein the fingerprint identification sensors 511 and the first pixel electrodes are disposed side by side, arranged in a column. It should be understood that since each pixel electrode 52 corresponds to one pixel unit 02 and are consistent in shape, the pixel units 02 comprise first pixel units with less area and second pixel units with more area, and the fingerprint identification sensors 511 and the first pixel units are disposed side-by-side, arranged in a column.

Optionally, the pixel units 02 are divided into red pixel units, green pixel units, and blue pixel units, which correspond to the red filter units 31R, the green filter units 31G, and the blue filter units 31B of the first substrate 30 respectively, and correspond to red pixel electrodes 52R, green pixel electrodes 52G, and blue pixel electrodes 52B of the second substrate 50 respectively. The red pixel electrodes 52R, the green pixel electrodes 52G, and the blue pixel electrodes 52B in each row are arranged periodically in order, wherein the blue pixel electrodes 52B are the first pixel electrodes and the red pixel electrodes 52R and the green pixel electrodes 52G are the second pixel electrodes, and the fingerprint identification sensors 511 and the blue pixel electrodes 52B are disposed side by side, arranged in a column.

In addition, it should be noted that in the display panel 01 provided in the embodiment of the present disclosure, the fingerprint identification layer 51 can cover a portion or an entire display area of the display panel 01, so as to achieve partial screen fingerprint identification or full-screen fingerprint identification.

In conclusion, in the display panels provided in the embodiments of the present disclosure, the second substrate providing the fingerprint identification layer is disposed close to the glass cover of the display panel, making the fingerprint identification layer closer to user's fingerprint, shortening the path of the light reflected by the fingerprint to the fingerprint identification sensors, and eliminating influence of the liquid crystal layer on the light reflected by the fingerprint. The upper polarizer is provided with the light transmitting units corresponding to the fingerprint identification sensors to reduce weakening of the light reflected by the fingerprint, thereby improving fingerprint identification effect.

It should be noted that although the present disclosure has been disclosed in the above specific embodiments, the above embodiments do not intend to limit the present disclosure. Various modifications and changes may be made by ordinary person skilled in the art without departing from the spirit and scope of this disclosure. Therefore, the scope of protection of this application is subject to the scope defined by the claims.

What is claimed is:

1. A display panel comprising:
    a backlight module configured as a light emitting unit of the display panel;
    a first substrate disposed on the backlight module and comprising a color filter layer;
    a second substrate disposed opposite to the first substrate away from the backlight module, wherein the second substrate comprises at least a thin film transistor array layer and a fingerprint identification layer, and the fingerprint identification layer is configured for identifying fingerprint information of a user;
    a liquid crystal layer comprising liquid crystals, and the liquid crystal layer disposed between the first substrate and the second substrate; and
    a glass cover disposed on the second substrate away from the liquid crystal layer,
    wherein the fingerprint identification layer comprises a plurality of fingerprint identification sensors, an upper polarizer is disposed between the second substrate and the glass cover and a lower polarizer is disposed between the first substrate and the backlight module, and the upper polarizer comprises light transmitting units vertically corresponding to the fingerprint identification sensors and located in a display area of the display panel.

2. The display panel as claimed in claim 1, wherein the light transmitting units comprise collimators or transmitting holes distributed in the upper polarizer.

3. The display panel as claimed in claim 1, wherein the fingerprint identification layer is disposed closer to the liquid crystal layer than the second substrate.

4. The display panel as claimed in claim 1, wherein the fingerprint identification layer is disposed further away from the liquid crystal layer than the second substrate.

5. The display panel as claimed in claim 1, wherein the second substrate comprises a touch function layer configured for realizing a touch function of the display panel.

6. The display panel as claimed in claim 1, wherein the color filter layer comprises a plurality of color filter units and the second substrate comprises pixel electrodes which are used to drive a deflection of the liquid crystals and correspond one-to-one to the color filter units, wherein each of the pixel electrodes corresponds to one of pixel units of the display panel, and the fingerprint identification sensors and the pixel units are mismatched in arrangement.

7. The display panel as claimed in claim 6, wherein a plane parallel to the second substrate is defined as a projection plane, a projection of the fingerprint identification sensors on the projection plane does not overlap with a projection of the pixel electrodes on the projection plane.

8. The display panel as claimed in claim 6, wherein the color filter units comprise red filter units, green filter units, and blue filter units.

9. The display panel as claimed in claim 8, wherein the pixel electrodes of the second substrate comprise red pixel electrodes, green pixel electrodes, and blue pixel electrodes, and the red pixel electrodes, the green pixel electrodes, and the blue pixel electrodes correspond to the red filter units, the green filter units, and the blue filter units respectively.

10. The display panel as claimed in claim 6, wherein the pixel units are disposed in rows side-by-side on the display panel, and each of the fingerprint identification sensors is disposed between two adjacent rows of the pixel units.

11. The display panel as claimed in claim 6, wherein the pixel units are disposed in rows side-by-side on the display panel, and each of the fingerprint identification sensors is disposed between two adjacent pixel units in a single row of the pixel units.

12. The display panel as claimed in claim 11, wherein three adjacent pixel units consist a group within each row of pixel units, and the group is provided with one of the fingerprint identification sensors.

13. The display panel as claimed in claim 6, wherein the pixel units are disposed in rows side-by-side on the display panel, a portion of the pixel units are smaller in surface area and are defined as first pixel units, and the other portion of the pixel units are defined as second pixel units, wherein the fingerprint identification sensors and the first pixel units are disposed side-by-side as a column.

14. The display panel as claimed in claim 1, wherein the fingerprint identification layer covers a portion of the display panel.

15. The display panel as claimed in claim 1, wherein the fingerprint identification layer covers an entire display area of the display panel.

16. A display panel comprising:
a backlight module configured as a light-emitting unit of the display panel;
a first substrate disposed on the backlight module and comprising a color filter layer;
a second substrate disposed opposite to the first substrate away from the backlight module, wherein the second substrate comprising at least a thin film transistor array layer and a fingerprint identification layer, the fingerprint identification layer configured for identifying a fingerprint information of a user;
a liquid crystal layer comprising liquid crystals disposed between the first substrate and the second substrate; and
a glass cover disposed on the second substrate away from the liquid crystal layer;
wherein the fingerprint identification layer comprises a plurality of fingerprint identification sensors, and an upper polarizer is disposed between the second substrate and the glass cover and comprises collimators or transmitting holes vertically corresponding to the fingerprint identification sensors and located in a display area of the display panel.

* * * * *